March 13, 1962 J. D. FORTUNE 3,025,003
DRIVE LOCK SPIKE
Filed Dec. 17, 1957
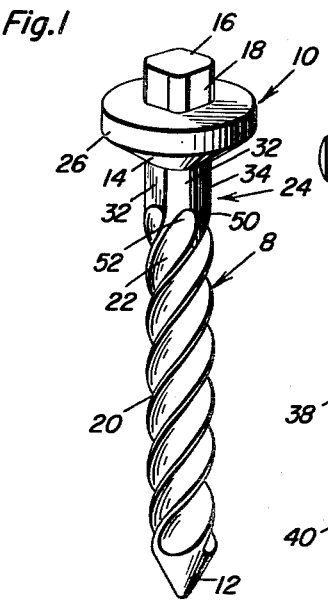
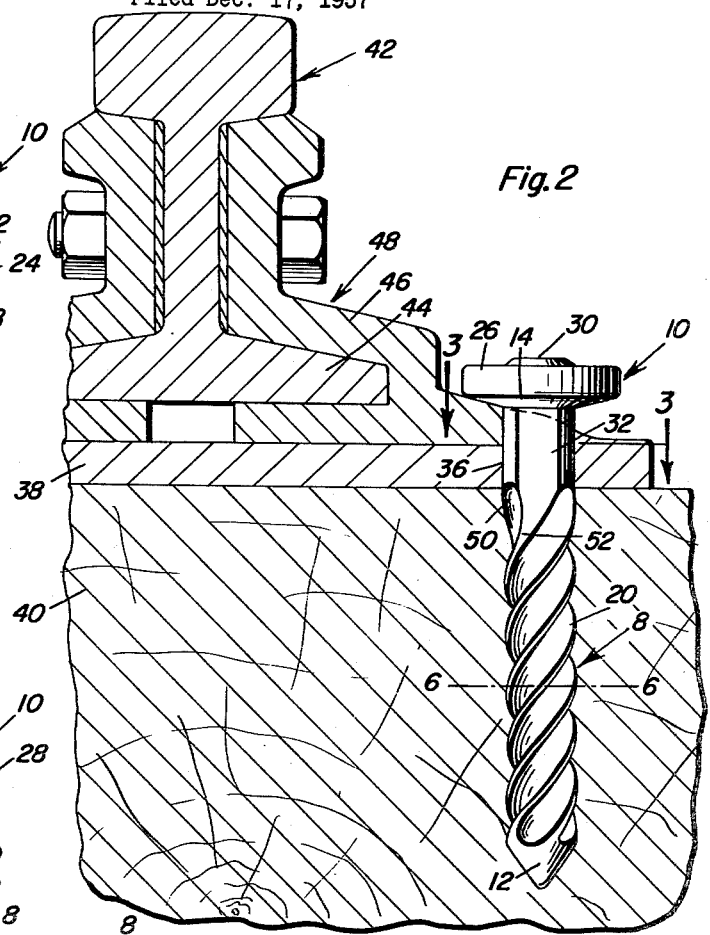
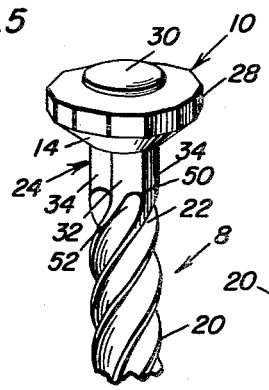
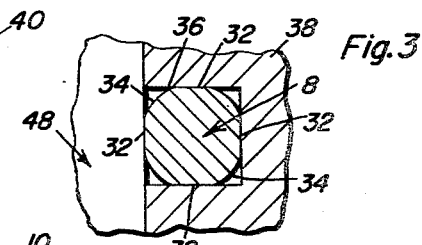
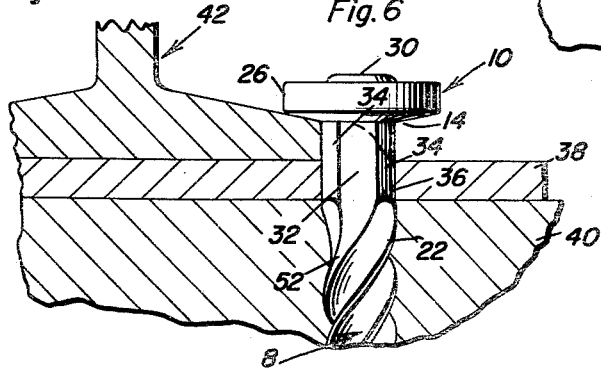
James D. Fortune
INVENTOR.

United States Patent Office 3,025,003
Patented Mar. 13, 1962

3,025,003
DRIVE LOCK SPIKE
James D. Fortune, 175 S. Backus Ave., East Pasadena, Calif., assignor of fifty percent to Stanley A. Smith, East Pasadena, Calif.
Filed Dec. 17, 1957, Ser. No. 703,306
2 Claims. (Cl. 238—372)

The present invention relates to certain new and useful improvements in a rail fastening spike which, because of its unique construction and the manner in which it functions, is herein classified as a drive lock spike; that is, a spike which is characterized by a drivable screw threaded shank having a tie-penetrating point at one end, and a novelly constructed driving and locking head at the other end.

As the introductory statement of the invention implies, a drive spike, generally speaking, is not new. That is to say, a drive spike having a shank with a helical screw thread and a hold-down head with a conical or tapered bottom surface, and a tool-gripping impact member centered atop the head is not new. Such a drive spike is shown in the De Vellier Patent No. 2,169,408. In the stated patent, the shank is tapered, this also being the construction with certain headed fasteners, generally referred to as drive screws.

The object of the instant invention is to structurally, functionally and otherwise improve upon the above named patent and any other structurally and functionally analogous prior art drive screws and screw threaded headed fasteners. In one respect, this objective is achieved through the use of a shank which, instead of being tapered, is of substantially uniform cross-section or outside diameter from the non-threaded, pointed end to the junctional connection of the shank with the driving and hold-down head.

More specifically, novelty is predicated on the combination aspect of the concept, with or without fishplates, but characterized by a wooden rail tie, a tie plate supported atop said tie and having at least one non-circular spike hole therethrough, a rail supported by way of said tie plate, and a drive lock spike embodying a shank having a pointed lower end and an enlarged head at the upper end of the shank, the top of said head having a centralized flat impact surface to receive driving blows from a spike driving maul, the bottom of said head being tapered, the body portion of said shank having helical screw threads extending and ranging from said pointed lower end to a place spaced a precise distance below the bottom of said head and the portion of the shank between said head and terminal upper ends of the screw threads defining a spike locking and tie plate anchoring and anti-slipping neck, said neck being of a length greater than the thickness of the tie plate and having portions firmly engaging and binding against cooperating perimeter portions of said spike hole, whereby said neck may be intentionally slid into the hole but when fully lodged therein functions to lock the spike against rotation and consequently secures the tie plate upon said tie.

Considering another aspect of the invention, the spike, as a new product of manufacture, is unique. To this end, the improved spike is to be interpreted in conjunction, for example, with a tie plate which has at least one square spike hole of a predetermined size at the desired place. More particularly, novelty is predicated on a drive lock spike comprising a shank having a pointed lower end and an enlarged head at the upper end of the shank, the top of said head having a centralized flat impact surface to receive driving blows from a spike driving maul, the bottom of said head being tapered, the body portion of said shank having helical screw threads extending and ranging from said pointed lower end to a place spaced a precise distance below the bottom of said head and the portion of the shank between said head and terminal upper ends of the screw threads defining a spike locking and tie plate anchoring and anti-slipping neck, said neck being of a length greater than the thickness of the tie plate and having portions firmly engaging and binding against cooperating perimeter portions of said spike hole, whereby said neck may be intentionally slid into the hole and, when fully lodged therein, will lock the spike against rotation and consequently secure the tie plate upon said tie.

In connection with the above, there is to be considered the novel neck which may be slid into and out of the square hole manually. The surface of the neck is provided with four equidistant, circumferentially spaced lengthwise flat locking surfaces or lands each parallel to and keyed and bound rigidly against the flat edge portion of the hole with which it has cooperative and retentive engagement.

In addition, there are lengthwise portions between the flat locking surfaces which are convex. Collectively, there are eight components or members which cooperate in bringing about the effective locking result whereby the flat lands binding and having metal contact with the four marginal edges of the square hole secure the tie plate (or rail connector) in place against slippage with the obvious attending advantages.

Many efforts have been made by others to securely fasten a tie plate to a wooden cross tie and also to fasten the flange portion of a rail directly atop the tie plate, as well as to fasten or secure the flanged marginal portion of a cooperating fishplate, that is, when a fishplate is used, in combination with the base flange of the rail and the underlying tie plate.

It is submitted that my improved drive spike having a relatively long neck capable of extending through the hole in the tie plate, and which provides the desired overhang of the bevelled undersurface of the head with the rail flange (or, alternatively, the fishplate flange), is indeed effectual and a practical advance in the art which will comply with manufacturing requirements and economies and will aptly meet the needs of all users of drive-type locking spikes.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a perspective view of the improved drive lock spike constructed in accordance with the principles of the present invention.

FIGURE 2 is a fragmentary view showing a portion of a tie, the tie plate seated thereon, a conventional rail, a modern fishplate, and the improved drive spike and the manner in which it is used.

FIGURE 3 is a section on the horizontal line 3—3 of FIG. 2, looking in the direction of the arrows.

FIGURE 4 is a fragmentary view, similar to FIG. 2, but with the fishplate omitted and the base flange of the rail clamped atop the tie plate.

FIGURE 5 is a fragmentary perspective view based on FIG. 1 and showing slight modifications in the head construction.

FIGURE 6 is a fragmentary sectional view, taken substantially in the plane of the line 6—6 in FIG. 2.

With reference first to the improved spike seen in FIG. 1, the shank, or stem, as it is sometimes called, is denoted generally by the numeral 8. The head on the upper end thereof is denoted at 10 and the smooth-surfaced lower penetrating point or leading end is denoted at 12. It will be observed that the underneath or bottom side of the circular or disk-like head is bevelled or tapered to the desired degree at 14. The top side of the head may be either flat or tapered. At the center of the top there is an extension or boss having a flat impact surface 16 and flat marginal portions 18. The surface 16 is there for the reception of blows received from a maul or sledge hammer (not shown). The flat surfaces 18 serve to accommodate a wrench (not shown) which has to be used whenever it is necessary for one to lift the spike for removal. As already mentioned, the shank is approximately uniform in cross-section or outside diameter ranging from the point 12 to the junctional connection of the shank with the bevelled surface 14. The body portion of the shank is provided with helical screw threads 20 and intervening spiralling flutes or grooves 22. It will be noticed that the upper ends of the threads terminate a predetermined distance downwardly from the tapered surface 14. Therefore, the shank comprises a screw threaded body and a neck, the neck 24 being the outstanding improvement.

With reference now to FIG. 5, it will be seen that the spike is approximately the same as that described, and for this reason like reference numerals apply to like parts. However, the marginal portion of the head instead of being smooth (as at 26 in FIG. 1) has flat faces 28 providing suitable tool-gripping means. The central projection or boss here is short, as at 30, and has a suitable impact surface, the tool-gripping means 18 of FIG. 1 being omitted. Otherwise, the two spikes are the same and in describing each neck it will be seen that it has four circumferentially spaced, equidistant, longitudinal, substantially rectangular flat surfaces or locking lands 32. The portions or surfaces therebetween are also longitudinal, but are convex and they are denoted by the numeral 34. These eight surfaces cooperate in the manner seen in section in FIG. 3. That is to say, when the neck is in the spike hole 36 of the tie plate 38, the convex surfaces 34 bridge the corner portions while the flat lands 32 bind firmly and lockingly against the median portions of their respective cooperating marginal edges of the square hole.

As seen in FIG. 2, the wooden cross-tie is denoted by the numeral 40 and the conventional rail by the numeral 42. As before stated and in practice, the base flange 44 of the rail may rest directly on the tie plate (not detailed or shown) or it may be embraced by the enclosing portion 46 of the modern-style fishplate 48. When the assembly is employed in the manner seen in FIG. 2, the bevelled surface 14 of the head overlies the flange portion of the fishplate. Where the fishplate is omitted, the bevelled surface would obviously overlie (not detailed) the corresponding portion of the flange 44.

It is further to be pointed out that the upper ends of the flutes and the screw threads have definite cooperative association and relationship to the four circumferentially spaced locking lands or surfaces 32. As seen in FIG. 2, the upper end of the groove, denoted at 50, registers properly with the lower major end portion of the flat locking surface 32. The upper end of the adjacent screw thread, as denoted at 52, registers or aligns with the lower minimal portion of 32 so that it merges with the companion surface 32. This construction facilitates piloting and the feeding in and removal steps of the locking neck with the square hole 36.

The pitch of the screw thread or threads may be variable and is approximately 38°. Other dimensions, being not necessarily critical, are not herein given.

The square head on the top of the flange will be used as a place to hit with spike maul to drive the spike in and also as it is square, a wrench can be used to take the spike out. The flange comes down on the flange of the rail, and as the flange comes down to the rail, the square or flat places on the main part of the spike come against the sides of the square holes in the fishplate and lock sufficiently to keep it from coming loose. The location of these flat places on the main part of the spike, and just under the flange, is very important, as they form the lock when the spike is completely down tight against the rail.

Novelty is predicated on the combination of tie, tie plate with square hole and the screw shank driven through the hole and screwed into the tie, plus the drive lock spike alone with its novelly constructed locking neck. The combination aspect is supported in FIGS. 2 and 4 and the screw-type spike in FIGS. 1 and 5.

It is to be pointed out that while the tool grip 16 and 18 in FIG. 1 is a projecting type, it is within the purview of the invention to substitue therefor a recess taking the form of a flat-sided socket. Prevailing practice and labor needs on current railroad constructions involve the use of various types of machinery. So it is within the purview of the concept to keep in mind the fact that machines can be used; that is to say, the spike head may be provided with a wrench-accommodating socket to accommodate a socket wrench on a power machine or an electric wrench may be used to put the spike in place. Also, a sledge hammer and not a spike maul may be used to bring the lock to its proper final position.

It is further to be mentioned that the style or type of fishplate seen in FIG. 2 of the drawing is not in any sense of the word limiting. Not only this, it is within the purview of the invention to engage the head of the spike in the way shown in FIGS. 2 and 4 and also to increase the length of the locking neck so that the head may overhang a base flange (not shown) on a fishplate which might be superimposed on the base flange of the conventional rail 42. However, it is believed to be unnecessary to illustrate these slight variations in the accompanying drawing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a wooden rail tie, a tie plate supported atop said tie and having at least one non-circular spike hole therethrough, a rail supported by way of said tie plate, and a drive lock spike embodying a shank having a pointed lower end and an enlarged head at the upper end of the shank, the top of said head having a centralized flat impact surface to receive driving blows from a spike driving maul, the body portion of said shank having helical screw threads starting adjacent and extending uninterruptedly from said pointed lower end to and terminating at a place spaced a precise predetermined distance below the bottom of said head, and the portion of the shank between the bottom said head and terminal upper ends of the screw threads being without threads and defining a spike locking and anchoring neck, said neck being of prescribed length, greater than the thickness of the tie plate, and having surface portions cooperating with perimeter portions of said spike hole, whereby said neck may be intentionally driven and passed downwardly through said spike hole but when fully lodged therein will lock the spike against rotation and consequently secure the tie plate upon said tie, said shank being generally circular in cross-section and of approximately the same outside diameter from the pointed tie penetrating end to said head, said spike hole being square, and said neck being provided with four equidistant circumferentially spaced lengthwise flat locking surfaces each parallel to the flat straight portion of the marginal edge of the hole with which it has cooperative and retentive engagement, the lengthwise portions of the neck between said flat locking surface being convex.

2. The structure defined in claim 1, and wherein the upper ends of the screw threads and the grooves between said threads align with, lead into, and merge with the lower end portions of their respective flat locking surfaces, and the convex portions bridge but do not physically engage the opposed respective corner portions of said spike hole.

References Cited in the file of this patent

UNITED STATES PATENTS

| | | |
|---|---|---|
| 2,417 | Steiger | Jan. 8, 1842 |
| 262,404 | Gray | Aug. 8, 1882 |
| 373,074 | Jones | Nov. 15, 1887 |
| 672,465 | Walker | Apr. 23, 1901 |
| 1,125,885 | Rouxel | Jan. 19, 1915 |
| 1,178,200 | Abbott | Apr. 4, 1916 |
| 1,192,125 | Sessler et al. | July 25, 1916 |
| 1,675,195 | Preston | June 26, 1928 |
| 2,169,408 | De Vellier | Aug. 15, 1939 |
| 2,317,435 | Black | Apr. 27, 1943 |
| 2,348,331 | Couch | May 9, 1944 |
| 2,450,361 | Scholes | Sept. 28, 1948 |